(12) United States Patent
Fujisawa

(10) Patent No.: US 10,473,311 B2
(45) Date of Patent: Nov. 12, 2019

(54) ANGLE ADJUSTER AND LIGHTING APPARATUS WITH ANGLE ADJUSTER

(71) Applicant: MINEBEA MITSUMI INC., Kitasaku-gun, Nagano (JP)

(72) Inventor: Shinichi Fujisawa, Akiruno (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/497,575

(22) Filed: Apr. 26, 2017

(65) Prior Publication Data

US 2017/0227201 A1     Aug. 10, 2017

Related U.S. Application Data

(63) Continuation of application No. PCT/JP2015/081149, filed on Nov. 5, 2015.

(30) Foreign Application Priority Data

Nov. 5, 2014   (JP) .................................. 2014-225256

(51) Int. Cl.
*F21V 21/30*     (2006.01)
*F21S 8/02*      (2006.01)
(Continued)

(52) U.S. Cl.
CPC .............. *F21V 21/30* (2013.01); *F21S 8/026* (2013.01); *F21V 14/02* (2013.01); *F21V 19/02* (2013.01); *F21V 23/0435* (2013.01); *B60R 2011/0092* (2013.01); *F21V 29/763* (2015.01); *F21Y 2115/10* (2016.08)

(58) Field of Classification Search
CPC .......... F21V 21/30; F21V 21/14; F21V 21/26; F21V 21/28; F21V 14/02; F21V 23/0435; F21V 19/02; F21S 8/026
See application file for complete search history.

(56) References Cited

U.S. PATENT DOCUMENTS

| 7,531,972 B1 | 5/2009 | Worsham et al. |
| 7,775,695 B1 * | 8/2010 | Rose .................... B60Q 1/0483 362/269 |

(Continued)

FOREIGN PATENT DOCUMENTS

| CN | 2674150 Y | 1/2005 |
| CN | 2814122 Y | 9/2006 |

(Continued)

OTHER PUBLICATIONS

Jan. 19, 2016 Written Opinion issued in International Patent Application No. PCT/JP2015/081149.

(Continued)

Primary Examiner — Y M. Lee
(74) Attorney, Agent, or Firm — Oliff PLC

(57) ABSTRACT

An angle adjuster is configured by disposing a first driver for driving a horizontal rotation frame (horizontal direction rotator) to rotate in the horizontal direction and a second driver for driving a vertical rotation frame (vertical direction rotator) to rotate in the vertical direction on the horizontal rotation frame. This configuration can reduce the size of the angle adjuster and a lighting apparatus with the angle adjuster.

6 Claims, 15 Drawing Sheets

(51) Int. Cl.
    *F21V 23/04*     (2006.01)
    *F21V 19/02*     (2006.01)
    *F21V 14/02*     (2006.01)
    *F21V 29/76*     (2015.01)
    *F21Y 115/10*     (2016.01)
    *B60R 11/00*     (2006.01)

(56) References Cited

U.S. PATENT DOCUMENTS

| | | | |
|---|---|---|---|
| 2007/0041194 A1 | 2/2007 | Chiu | |
| 2009/0168425 A1* | 7/2009 | Chuang | F21S 10/02 362/284 |
| 2010/0309656 A1* | 12/2010 | O'Sullivan | F21L 4/045 362/197 |
| 2014/0177258 A1* | 6/2014 | Gebhard et al. | B60Q 1/245 362/547 |
| 2015/0109800 A1* | 4/2015 | Wang | F21V 21/30 362/368 |
| 2015/0276190 A1* | 10/2015 | Devlin | F21V 21/15 362/362 |

FOREIGN PATENT DOCUMENTS

| | | |
|---|---|---|
| CN | 103782095 A | 5/2014 |
| JP | H03-071510 U | 7/1991 |
| JP | H03-246807 A | 11/1991 |
| TW | M486727 U | 9/2014 |

OTHER PUBLICATIONS

Jan. 19, 2016 International Search Report issued in International Patent Application No. PCT/JP2015/081149.

European Search Report dated Apr. 5, 2018 in European Patent Application No. 15856844.4.

Nov. 29, 2018 Office Action issued in Chinese Patent Application No. 201580059235.0.

Aug. 9, 2019 Office Action issued in Chinese Patent Application No. 201580059235.0.

* cited by examiner

ANGLE ADJUSTER AND LIGHTING APPARATUS WITH ANGLE ADJUSTER

CROSS-REFERENCE TO RELATED APPLICATIONS

This application is a continuation of PCT international application Ser. No. PCT/JP2015/081149 filed on Nov. 5, 2015 which designates the United States, and which claims the benefit of priority from Japanese Patent Application No. 2014-225256, filed on Nov. 5, 2014; the entire contents of which are incorporated herein by reference.

FIELD

The present invention relates to an angle adjuster for adjusting an angle of an operation target through remote control and a lighting apparatus with the angle adjuster.

BACKGROUND

For example, Patent Literature 1 discloses an illumination apparatus for adjusting an angle of an illumination lamp installed on a ceiling by operating movable switches in a switch box attached to a wall. This illumination apparatus has a horizontal driving unit that drives an illumination lamp in the horizontal direction and a vertical driving unit that drives the illumination lamp in the vertical direction disposed in a vertical row, and the total length thereof becomes long. Accordingly, an angle adjuster is desired to be reduced in size, for example, for applying the angle adjuster to a ceiling-embedded downlight.

SUMMARY

An angle adjuster according to the present invention for adjusting an angle of an operation target includes a frame body, a horizontal direction rotator, a vertical direction rotator, a first driver and a second driver. The horizontal direction rotator is rotatably supported in a horizontal direction by the frame body. The vertical direction rotator is rotatably supported in a vertical direction by the horizontal direction rotator. The operation target is fixed to the vertical direction rotator. The first driver drives the horizontal direction rotator. The second driver drives the vertical direction rotator.

DETAILED DESCRIPTION

Figure 1:
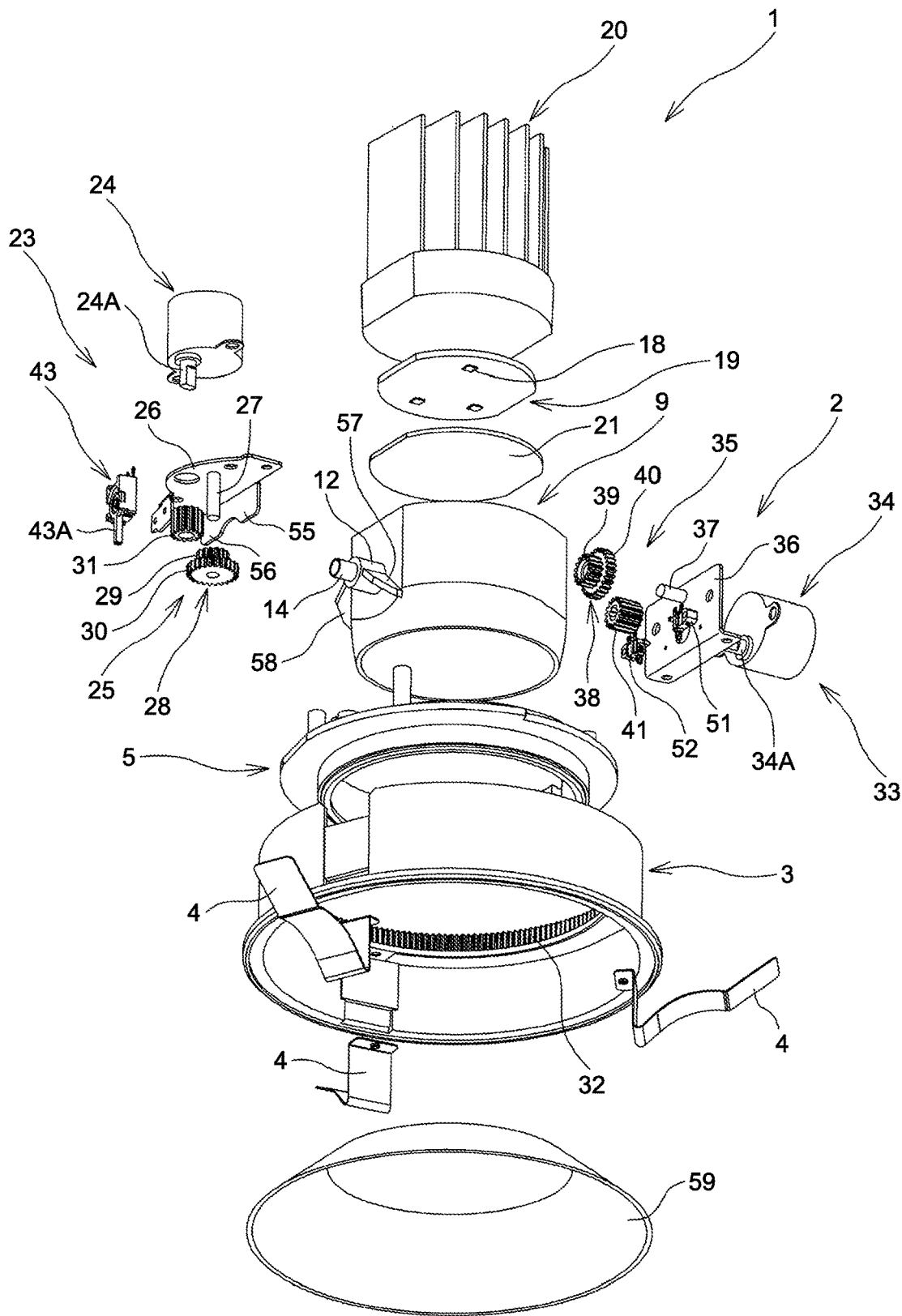
FIG. 1 is a disassembled perspective view illustrating a lighting apparatus in accordance with an embodiment of the present invention.

An embodiment of the present invention will now be described with reference to the accompanying drawings. The embodiment exemplifies what is called a universal downlight that is attached to an embedded hole previously provided to an indoor ceiling as a lighting apparatus 1 with an angle adjuster 2. Hereinafter, an up-and-down direction in FIG. 1 is referred to as a "vertical direction" for convenience. A direction (for example, a right-and-left direction in FIG. 1) vertical to the vertical direction is referred to as a "horizontal direction". The vertical direction described below includes a perpendicular direction, but is not limited to this. Hereinafter, "rotation in the horizontal direction" indicates rotation around a straight line elongating in the vertical direction (in the embodiment, especially a straight line corresponding to the center line of the lighting apparatus 1) as a rotation shaft. Hereinafter, "rotation in the vertical direction" indicates rotation around a straight line elongating in the horizontal direction (in the embodiment, especially a straight line perpendicular to the center line of the lighting apparatus 1) as a rotation shaft.

Figure 2:
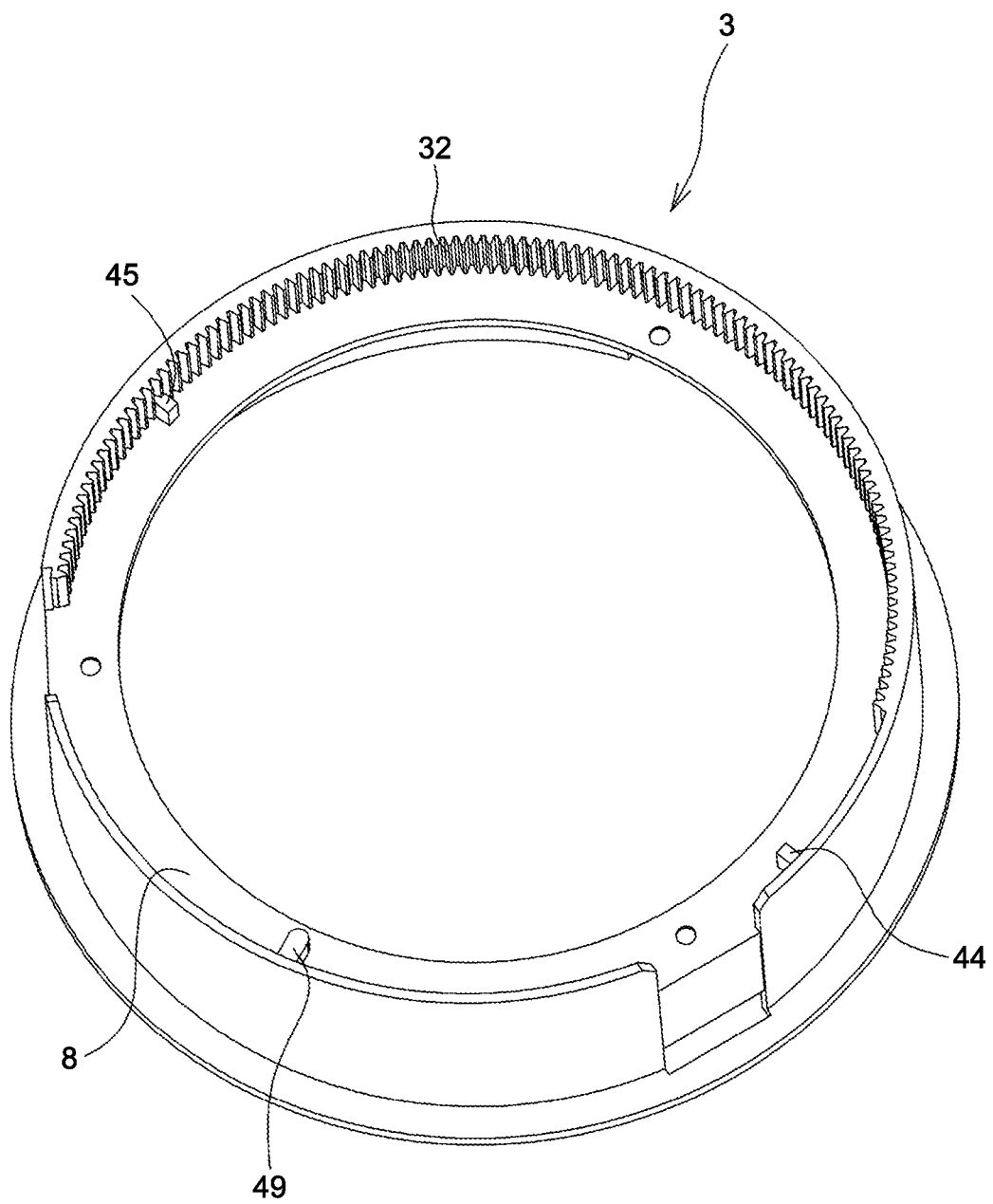
FIG. 2 is a perspective view illustrating a fixed frame single body.

As illustrated in FIG. 1, the lighting apparatus 1 includes a fixed frame 3 (frame body) embedded in an embedded hole. As illustrated in FIG. 2, the fixed frame 3 is a resin molded member formed in a cylindrical shape. A plurality of (in the embodiment, three) fixtures 4 (see FIG. 1) for fixing the fixed frame 3 to the embedded hole is attached on the outer periphery of the fixed frame 3 at equal intervals along a peripheral direction. A reflecting member 59 is attached to the fixed frame 3.

Figure 3:
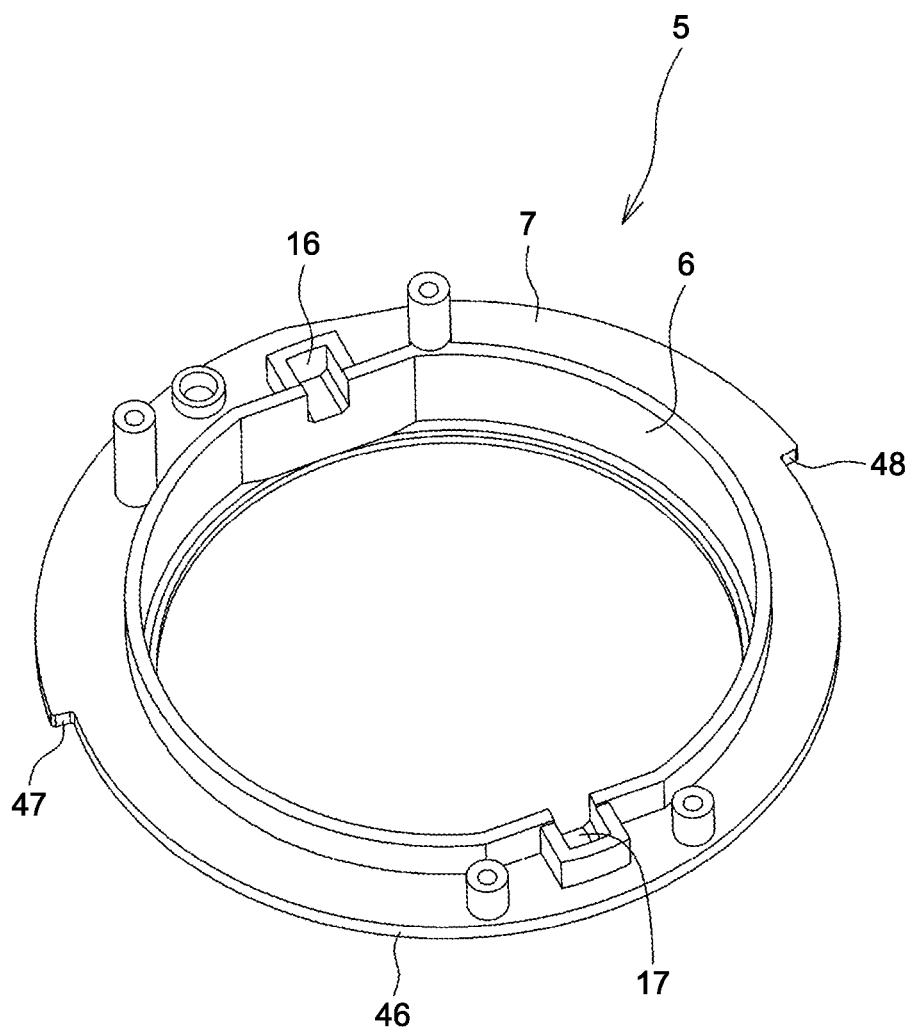
FIG. 3 is a perspective view illustrating a horizontal rotation frame single body.

As illustrated in FIG. 1, the lighting apparatus 1 includes a horizontal rotation frame 5 as a horizontal direction rotator. As illustrated in FIG. 3, the horizontal rotation frame 5 is a resin molded member that includes a shaft unit 6 and an outer flange 7 formed on the outer periphery of the shaft unit 6, and is formed in an annular shape. The outer flange 7 in the horizontal rotation frame 5 is slidably supported by an inner flange 8 (see FIG. 2) formed on the inner periphery of the fixed frame 3. In this manner, the horizontal rotation frame 5 is rotatably supported in the horizontal direction by the fixed frame 3.

Figure 4:
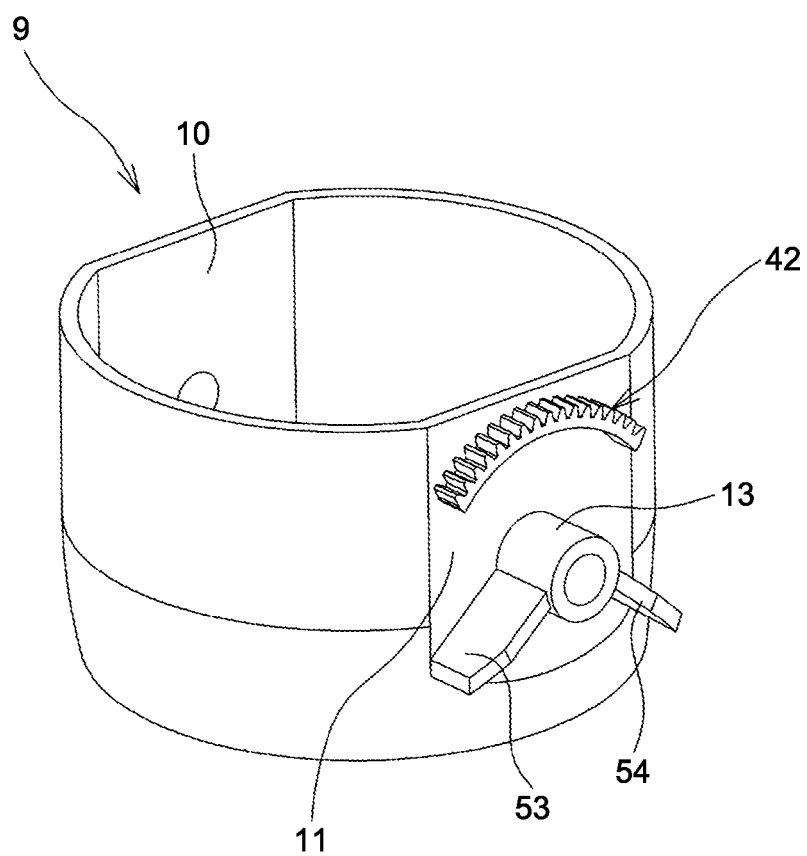
FIG. 4 is a perspective view illustrating a vertical rotation frame single body.
Figure 5:
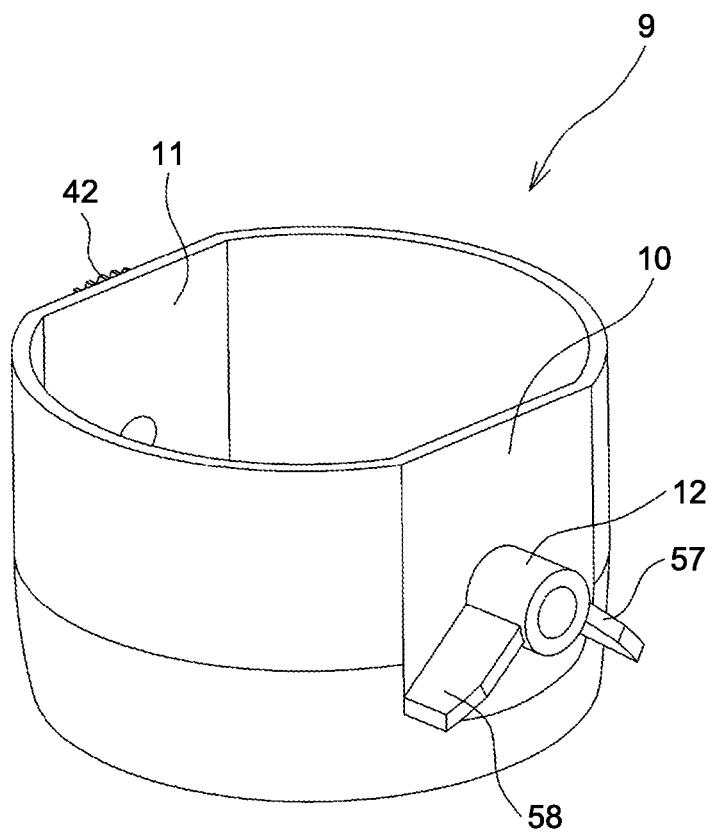
FIG. 5 is a perspective view illustrating the vertical rotation frame single body, and is a view illustrating the vertical rotation frame in FIG. 4 viewed from another sight different from the sight in FIG. 4.
Figure 10:
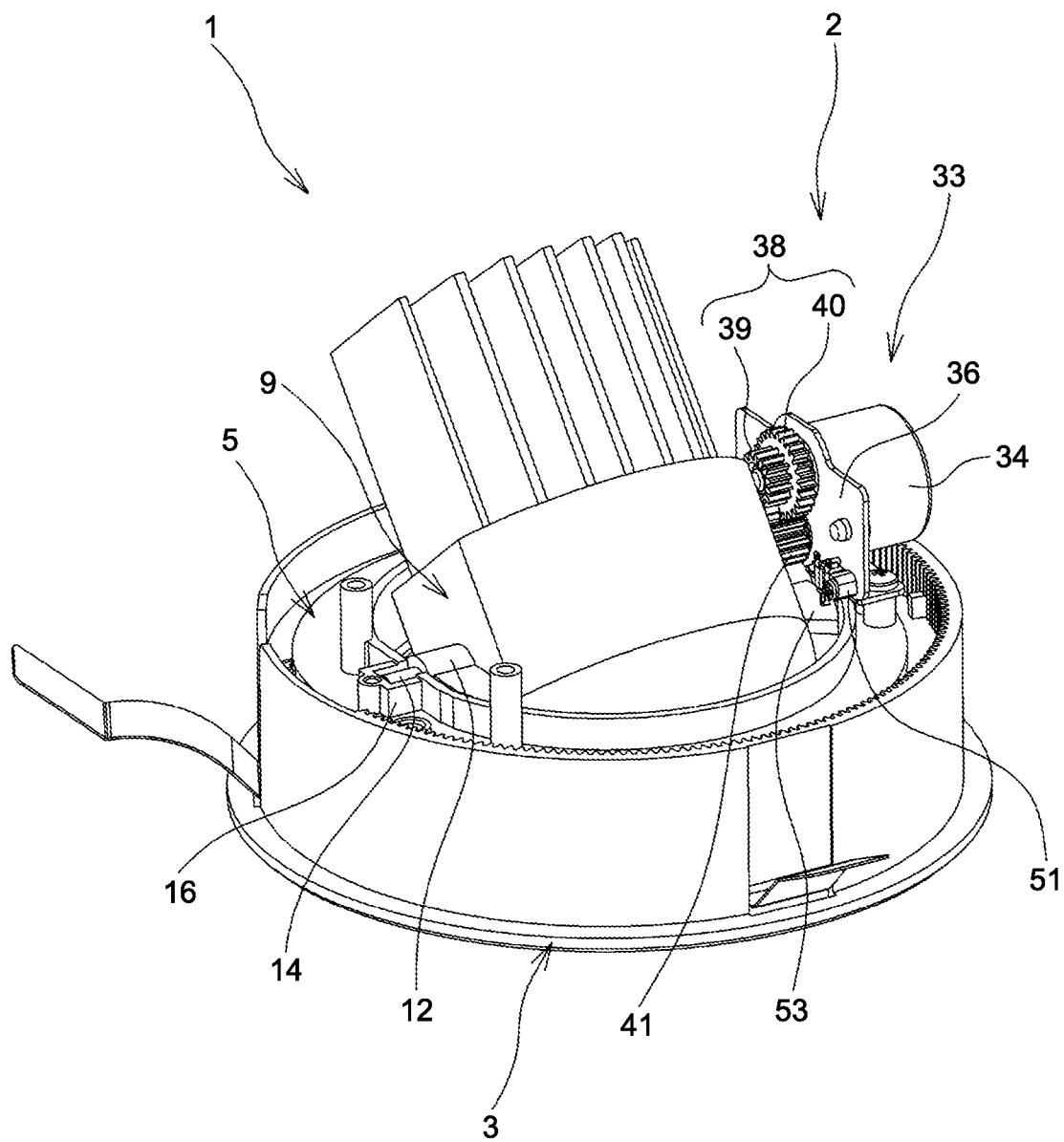
FIG. 10 is a perspective view illustrating the lighting apparatus with the first driver omitted, and is an explanatory view especially illustrating a mechanism that electrically restricts rotation operation of the vertical rotation frame in the vertical direction.
Figure 11:
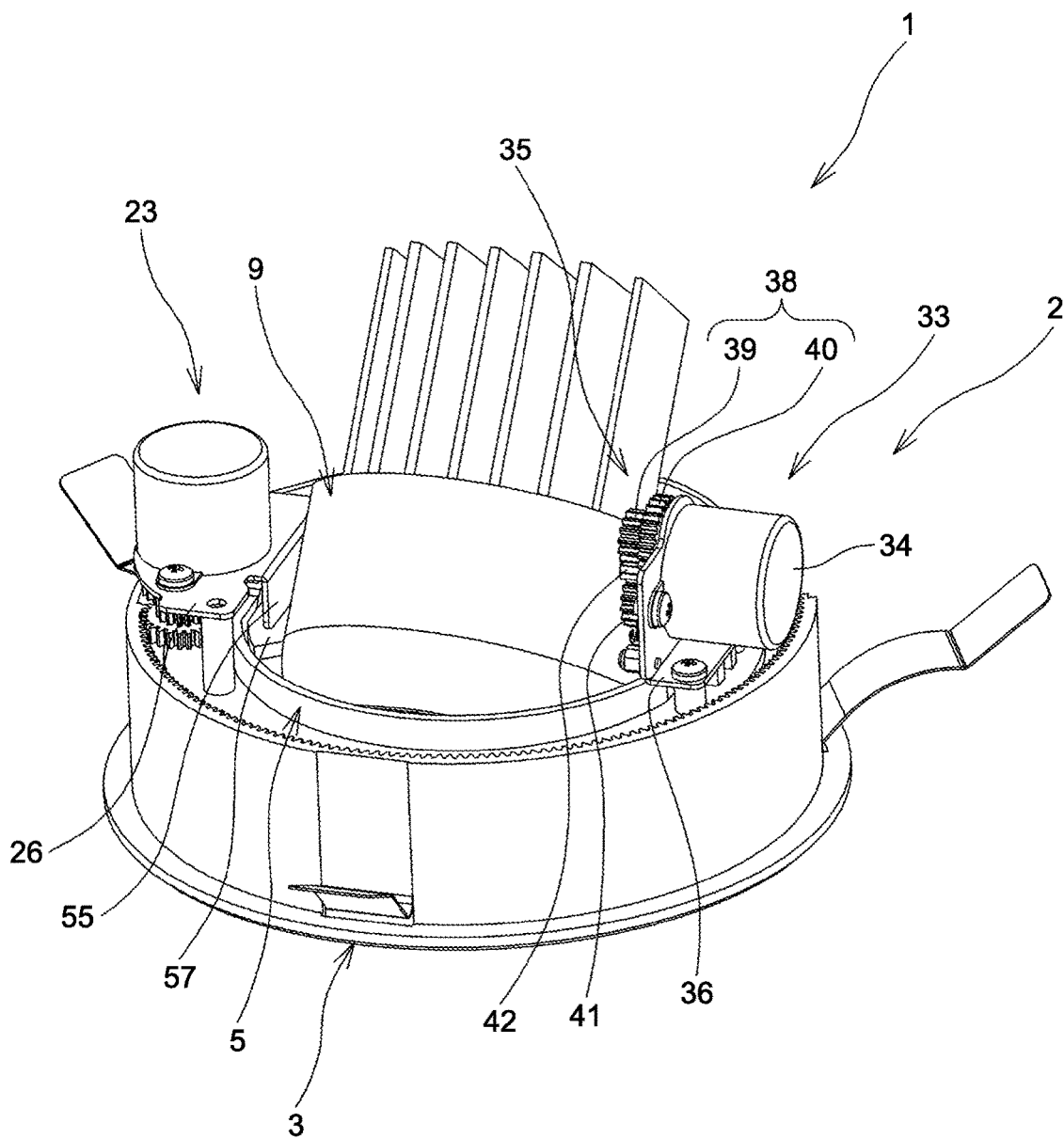
FIG. 11 is a perspective view illustrating the lighting apparatus, and is an explanatory view especially illustrating a vertical rotation restriction mechanism.

As illustrated in FIG. 1, the lighting apparatus 1 includes a vertical rotation frame 9 as a vertical direction rotator. As illustrated in FIGS. 4 and 5, the vertical rotation frame 9 is a resin molded member formed in a substantially cylindrical shape. The vertical rotation frame 9 includes a pair of flat side walls 10 and 11 disposed parallel to a shaft plane. A pair of bosses 12 and 13 is provided on the external surface of the side walls 10 and 11, respectively. The bosses 12 and 13 are disposed on a straight line (on the same straight line) perpendicular to the shaft line of the vertical rotation frame 9. One end of hollow shafts 14 and 15 (see FIGS. 8 and 10) is engaged with the inner periphery of the bosses 12 and 13, respectively. The other end of the hollow shafts 14 and 15, in other words, the part of the hollow shafts 14 and 15 projecting from the bosses 12 and 13 is supported by corresponding shaft bearings 16 and 17 (see FIG. 3) formed on the outer flange 7 of the horizontal rotation frame 5. In this manner, the vertical rotation frame 9 is rotatably supported centering on the shaft line of the hollow shafts 14 and 15 in the vertical direction by the horizontal rotation frame 5.

As illustrated in FIG. 1, the vertical rotation frame 9 has a mounting board 19 on which a plurality of (for example, three) light-emitting diodes (LEDs) 18 serving as an operation target as a light source is mounted, a heat sink 20 to which the mounting board 19 is fixed, and a lens 21 for adjusting a light distribution angle of light emitted from the light source disposed thereon. In the embodiment, illustrations and detailed explanation on peripheral apparatuses of the LEDs 18 are omitted in order to simplify the description of the specification and the drawings.

Figure 6:
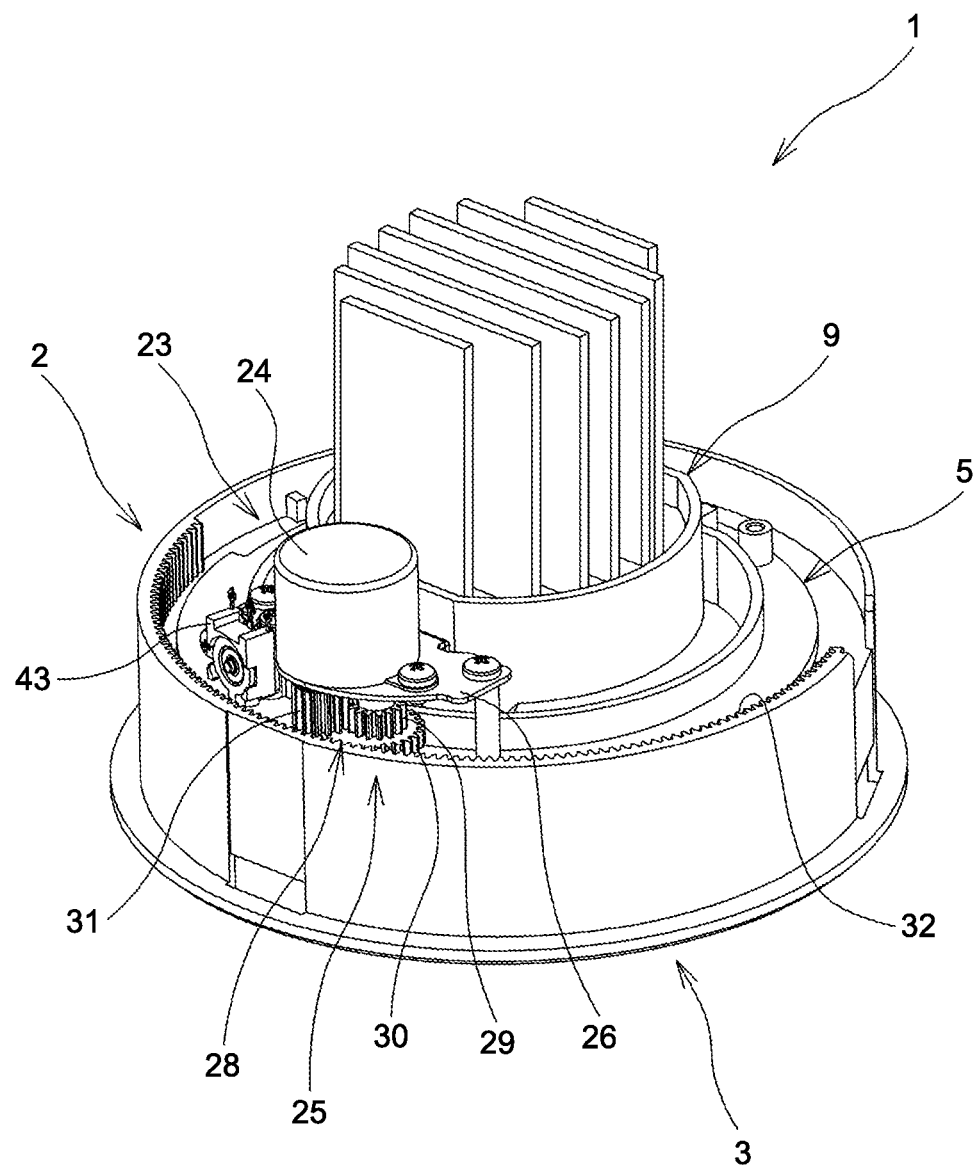
FIG. 6 is a perspective view illustrating the lighting apparatus, and is an explanatory view especially illustrating a first driver.

The angle adjuster 2 includes a first driver 23 that drives the horizontal rotation frame 5 to rotate in the horizontal direction and a second driver 33 that drives the vertical rotation frame 9 to rotate in the vertical direction. As illustrated in FIGS. 1 and 6, the first driver 23 includes a first motor 24 as a drive source and a first gear mechanism 25 that transmits power generated by the first motor 24 to the horizontal rotation frame 5. The first motor 24 is fixed to a first bracket 26 attached to the horizontal rotation frame 5 so as to dispose a rotation shaft 24A vertically (perpendicularly). A stepping motor is applied to the first motor 24, and a lead wire (not illustrated) extending from the first motor 24 is inserted into a shaft hole of the hollow shaft 14 and is connected to a drive circuit (not illustrated) fixed to the vertical rotation frame 9.

The first gear mechanism 25 includes a first stepped spur gear 28 that is rotatably supported by a first pin 27 (see FIG. 1) joined to the first bracket 26, and is provided with a small gear 29 (first gear) and a large gear 30 (second gear). In the first stepped spur gear 28, the small gear 29 is engaged with a first pinion 31 fixed to the rotation shaft 24A of the first motor 24, and the large gear 30 is engaged with internal teeth 32 formed along the inner periphery of the fixed frame 3.

Figure 7:
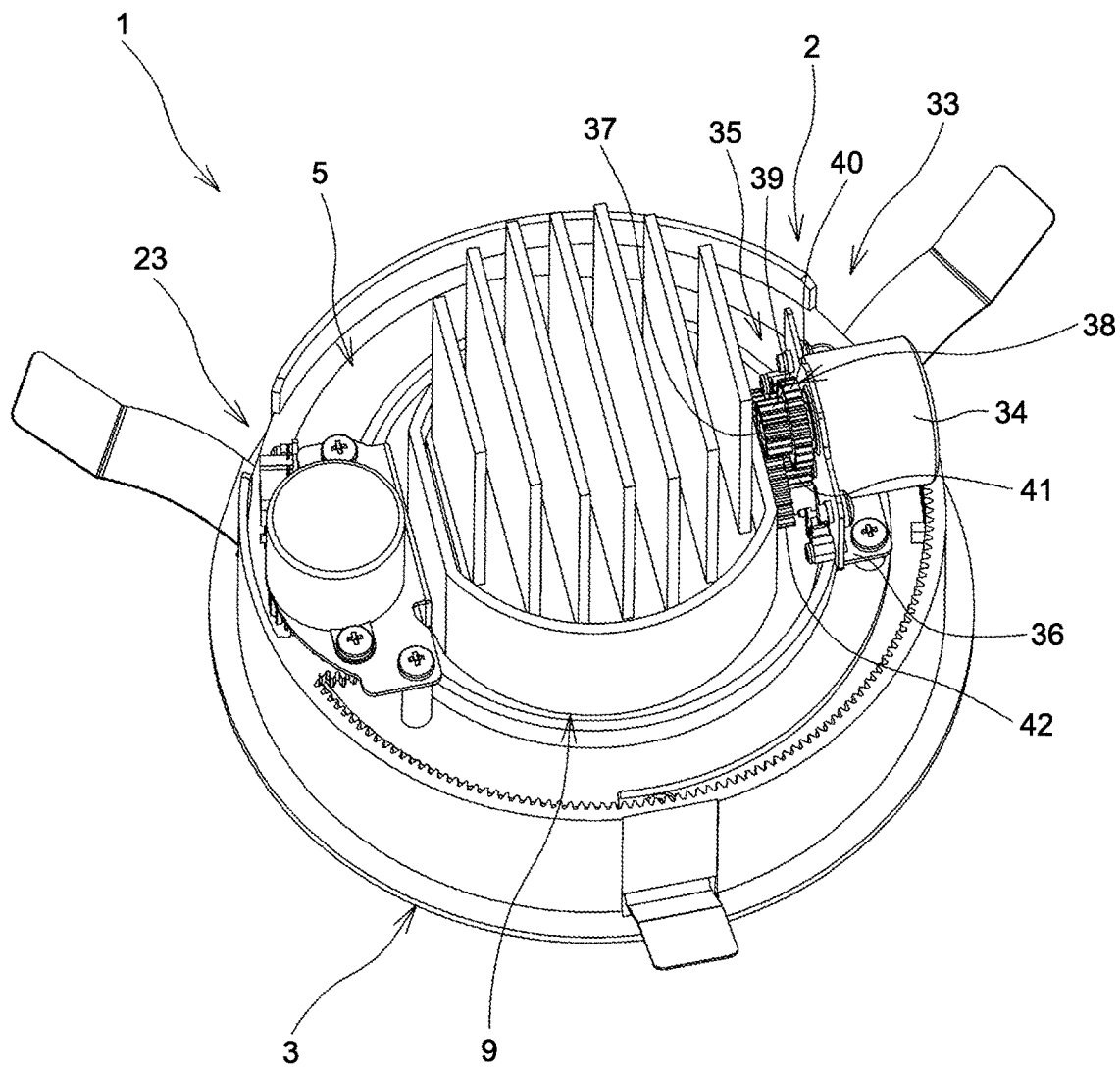
FIG. 7 is a perspective view illustrating the lighting apparatus, and is an explanatory view especially illustrating a second driver.

As illustrated in FIGS. 1 and 7, the second driver 33 includes a second motor 34 as a drive source and a second gear mechanism 35 that transmits power generated by the second motor 34 to the vertical rotation frame 9. The second motor 34 is fixed to a second bracket 36 attached to the horizontal rotation frame 5 so as to dispose a rotation shaft 34A horizontally. A stepping motor having an identical shape (same type) as that of the first motor 24 is applied to the second motor 34, and a lead wire (not illustrated) extending from the second motor 34 is inserted into a shaft hole of the hollow shaft 15 and is connected to a drive circuit (not illustrated) fixed to the vertical rotation frame 9.

The second gear mechanism 35 includes a second stepped spur gear 38 that is rotatably supported by a second pin 37 (see FIG. 7) joined to the second bracket 36 and is provided with a small gear 39 (first gear) and a large gear 40 (second gear). In the second stepped spur gear 38, the large gear 40 is engaged with a second pinion 41 fixed to the rotation shaft 34A of the second motor 34, and the small gear 39 is engaged with external teeth 42 (see FIG. 4) provided to the side wall 11 of the vertical rotation frame 9 and formed along a circular arc centering the rotation shaft (boss 13) of the vertical rotation frame 9.

The first stepped spur gear 28 and the second stepped spur gear 38 have an identical shape. In other words, the small gear 29 (first gear) and the large gear 30 (second gear) in the first stepped spur gear 28 and the small gear 39 (first gear) and the large gear 40 (second gear) in the second stepped spur gear 38 have an identical shape. Similarly, the first pinion 31 fixed to the rotation shaft 24A of the first motor 24 and the second pinion 41 fixed to the rotation shaft 34A of the second motor 34 have an identical shape.

The angle adjuster 2 includes a controller for remotely controlling the first driver 23 (first motor 24) and the second driver 33 (second motor 34) using wireless communication and accordingly operating an irradiation direction of the lighting apparatus 1 by wireless. The controller includes a transmitter (remote controller) that is operated by an operator, a receiver that is provided to the vertical rotation frame 9 and receives control radio waves transmitted from the transmitter, and a control apparatus that controls operation of each of the motors 24 and 34 based on the control radio waves received by the receiver. The conventional technique is applied to the controller. Thus, detailed explanation and illustrations related to the controller are omitted in order to simplify the description of the specification and the drawings.

In the embodiment, the angle adjuster 2 defines the shape of the small gear 29 and the large gear 30 in the first stepped spur gear 28, and accordingly the shape of the small gear 39 and the large gear 40 in the second stepped spur gear 38 having an identical shape as that of the first stepped spur gear 28 so that a rotation angle (angular displacement) of the horizontal rotation frame 5 in the horizontal direction upon input of one pulse to the first motor 24 is identical or substantially equal to a rotation angle (angular displacement) of the vertical rotation frame 9 in the vertical direction upon input of one pulse to the second motor 34. In other words, a change gear ratio between the first gear mechanism 25 and the second gear mechanism 35 is determined so that a rotation angle (angular displacement) of the horizontal direction rotator in the horizontal direction upon input of one pulse to the first driver 23 is identical or substantially equal to a rotation angle (angular displacement) of the vertical direction rotator in the vertical direction upon input of one pulse to the second driver 33.

Figure 8:
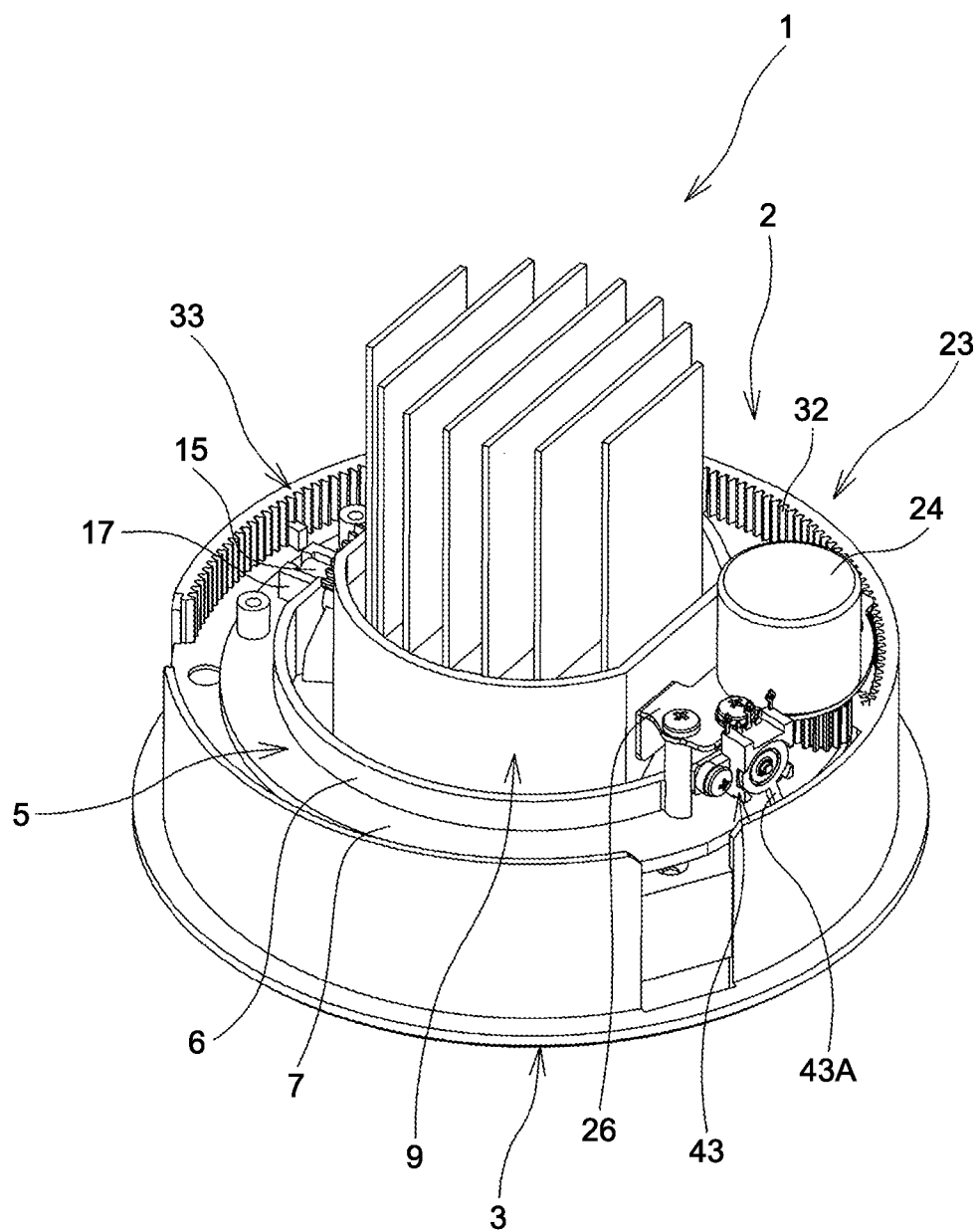
FIG. 8 is a perspective view illustrating the lighting apparatus, and is an explanatory view especially illustrating a mechanism that electrically restricts rotation operation of the horizontal rotation frame in the horizontal direction.

As illustrated in FIGS. 1 and 8, the angle adjuster 2 includes a limit switch 43 that is attached to the first bracket 26 and electrically detects rotation operation of the horizontal rotation frame 5 in the horizontal direction. A lever 43A of the limit switch 43 is rotated (see FIG. 8) by either of two projections 44 and 45 (see FIG. 2) formed on the inner flange 8 of the fixed frame 3. Accordingly, the angle adjuster 2 detects a limit of the set rotation angle and uses the detected limit for motor control such as stopping operation of the first motor 24. In the embodiment, the limit switch 43 and the two projections 44 and 45 can restrict a rotation angle of the horizontal rotation frame 5 in the horizontal direction to ±90 degrees.

Figure 9:
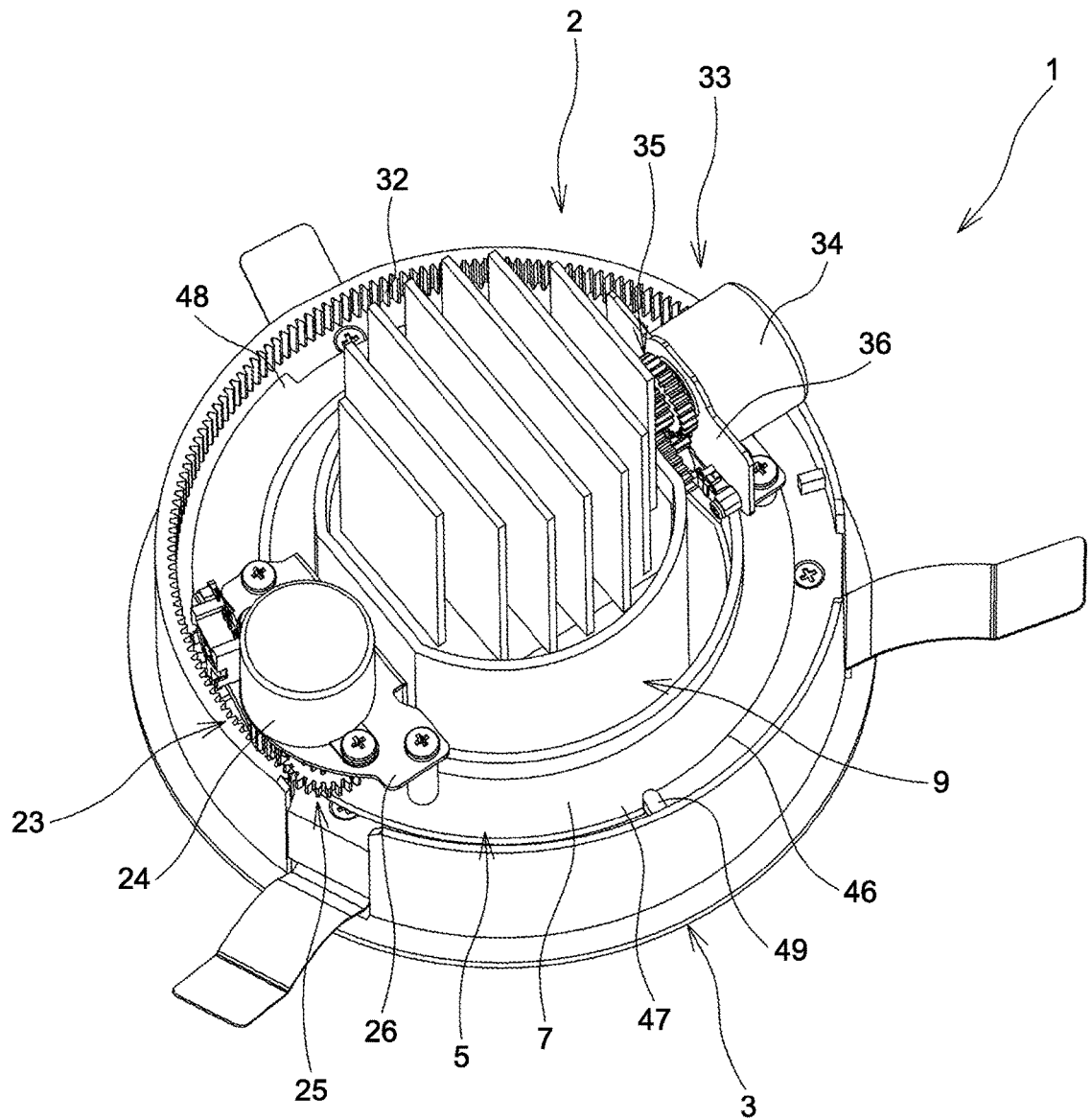
FIG. 9 is a perspective view illustrating the lighting apparatus, and is an explanatory view especially illustrating a horizontal rotation restriction mechanism.

The angle adjuster 2 further includes a horizontal rotation restriction mechanism that mechanically restricts rotation operation of the horizontal rotation frame 5 in the horizontal direction when the horizontal rotation frame 5 rotates beyond the limit switch 43. As illustrated in FIG. 9, the horizontal rotation restriction mechanism is configured by a notch 46 formed by notching a substantially half periphery out of the outer periphery of the outer flange 7 in the horizontal rotation frame 5, contact units 47 and 48 (see FIG. 3) formed on both ends of the notch 46, and a projection 49 formed on the inner flange 8 in the fixed frame 3. The horizontal rotation restriction mechanism mechanically restricts a rotation angle of the horizontal rotation frame 5 in the horizontal direction within a predetermined range by making either one of the contact units 47 and 48 formed on the outer flange 7 contact with the projection 49 formed on the inner flange 8 in the fixed frame 3.

As illustrated in FIG. 1, the angle adjuster 2 includes two limit switches 51 and 52 that are attached to the second bracket 36 and electrically detect rotation operation of the vertical rotation frame 9 in the vertical direction. An actuator of either one of the limit switches 51 and 52 is pushed in by corresponding rib 53 or 54 (see FIG. 4) formed on the side wall 11 of the vertical rotation frame 9 (see FIG. 10 that illustrates only the limit switch 51 and the corresponding rib 53 for convenience). Accordingly, the angle adjuster 2 detects a limit of the set rotation angle and uses the detected limit for motor control such as stopping operation of the second motor 34. In the embodiment, the two limit switches 51 and 52 and the corresponding ribs 53 and 54 can restrict a rotation angle of the vertical rotation frame 9 in the vertical direction to ±40 degrees.

The angle adjuster 2 further includes a vertical rotation restriction mechanism that mechanically restricts rotation operation of the vertical rotation frame 9 in the vertical direction when the vertical rotation frame 9 rotates beyond the limit switches 51 and 52. The vertical rotation restriction mechanism is configured by a pair of contact pieces 55 and 56 (see FIG. 1) disposed on the first bracket 26 at intervals in the horizontal direction, and corresponding ribs 57 and 58 formed on the side wall 10 of the vertical rotation frame 9. The vertical rotation restriction mechanism mechanically restricts a rotation angle of the vertical rotation frame 9 in the vertical direction within a predetermined range by making either one of the contact pieces 55 and 56 provided to the first bracket 26 contact with the corresponding rib 57 or 58 formed on the side wall 10 of the vertical rotation frame 9.

Figure 12:
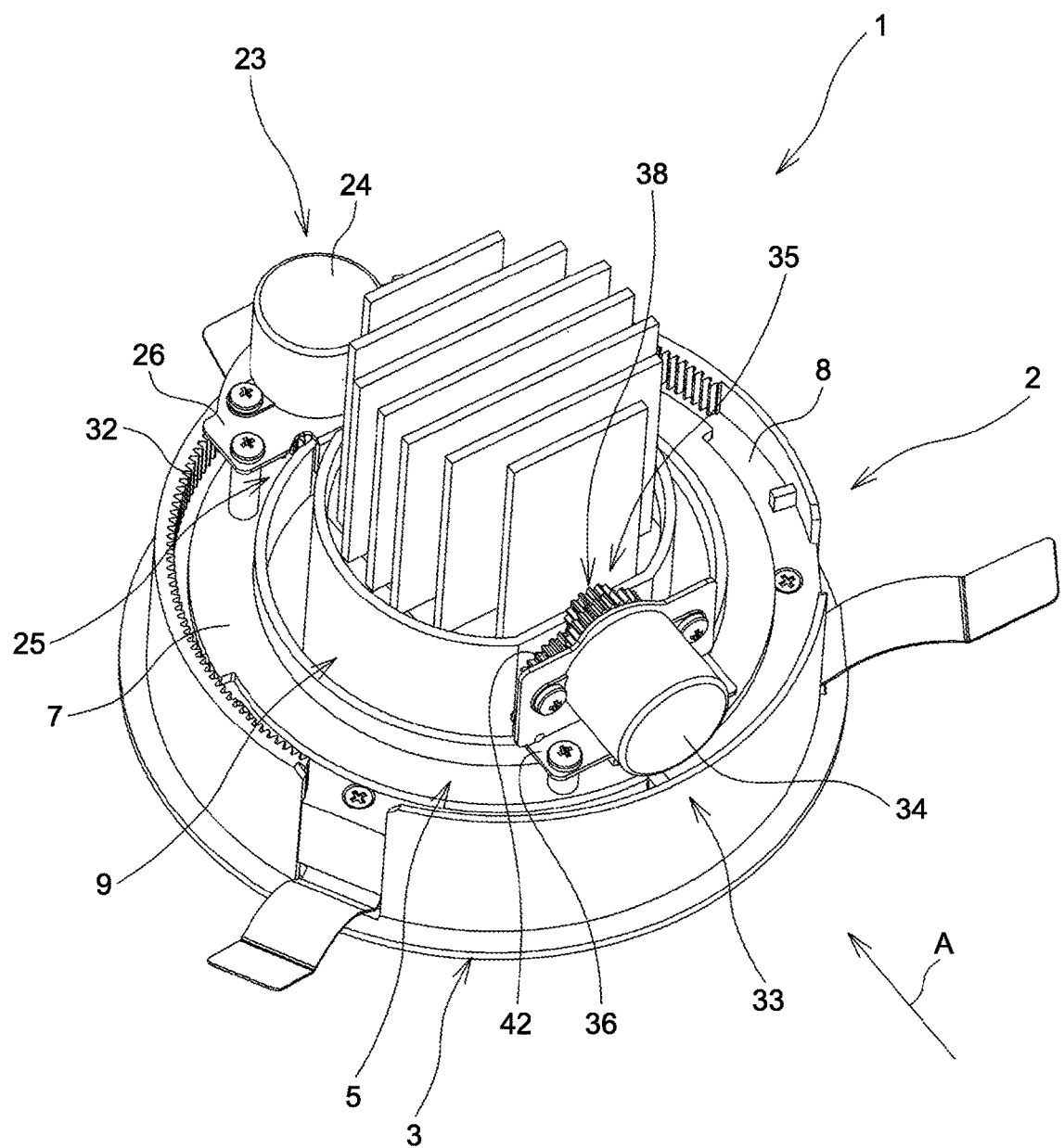
FIG. 12 is a perspective view illustrating the lighting apparatus, and is a view especially illustrating an initial state of an angle adjuster.
Figure 13:
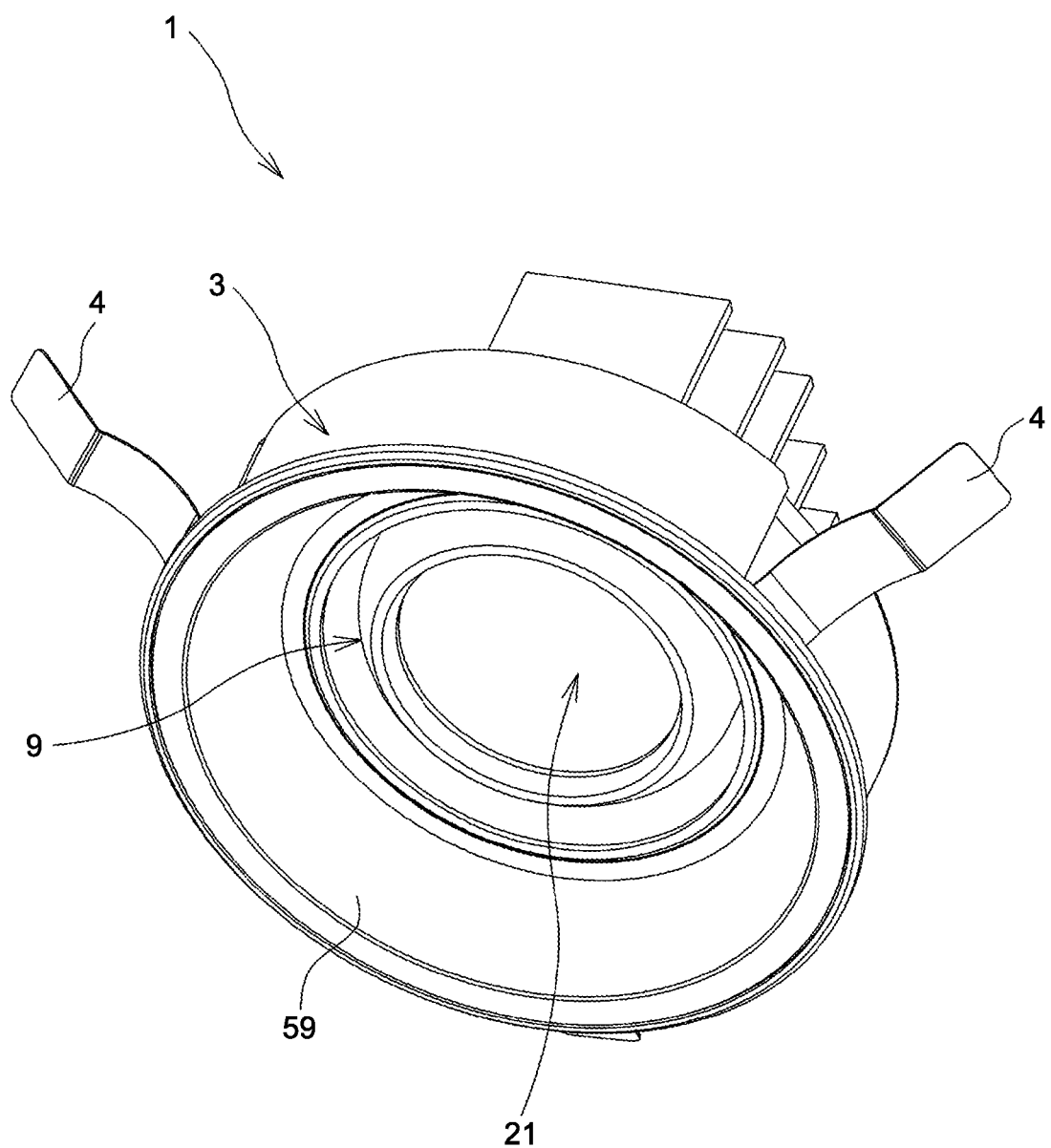
FIG. 13 is a perspective view illustrating the lighting apparatus, and is a view especially illustrating the lighting apparatus where the angle adjuster illustrated in FIG. 12 is in an initial state viewed from another sight different from the sight in FIG. 12.

The following describes the action of the embodiment. FIG. 12 is a perspective view illustrating the lighting apparatus 1, and is a view especially illustrating an initial state of the angle adjuster 2. In the initial state of the angle adjuster 2, a rotation position of the horizontal rotation frame 5 (horizontal direction rotator) in the horizontal direction is 0 degrees, and a rotation position of the vertical rotation frame 9 (vertical direction rotator) in the vertical direction is 0 degrees. In the initial state of the angle adjuster 2, an irradiation direction of the lighting apparatus 1 is a just-under direction (perpendicular direction). FIG. 13 is a view illustrating the lighting apparatus 1 where the angle adjuster 2 is in an initial state viewed from another sight different from the sight in FIG. 12.

An operator operates a remote controller (controller) so as to remotely control an irradiation direction of the lighting apparatus 1 (hereinafter simply referred to as an "irradiation direction"). For example, when the irradiation direction is inclined from 0 degrees of an initial state to a clockwise direction at a sight in A direction in FIG. 12, operation of a remote controller operated by an operator causes the rotation shaft 34A of the second motor 34 to rotate in a direction specified by a rotation angle (angular displacement) corresponding to the number of pulse input. The rotation of the rotation shaft 34A of the second motor 34 is transmitted to the second gear mechanism 35 through the second pinion 41, and is decelerated and transmitted to the vertical rotation frame 9 through the large gear 40 (second gear) of the second stepped spur gear 38 engaged with the second pinion 41, the small gear 39 (first gear) of the second stepped spur gear 38, and the external teeth 42 engaged with the small gear 39.

Figure 14:
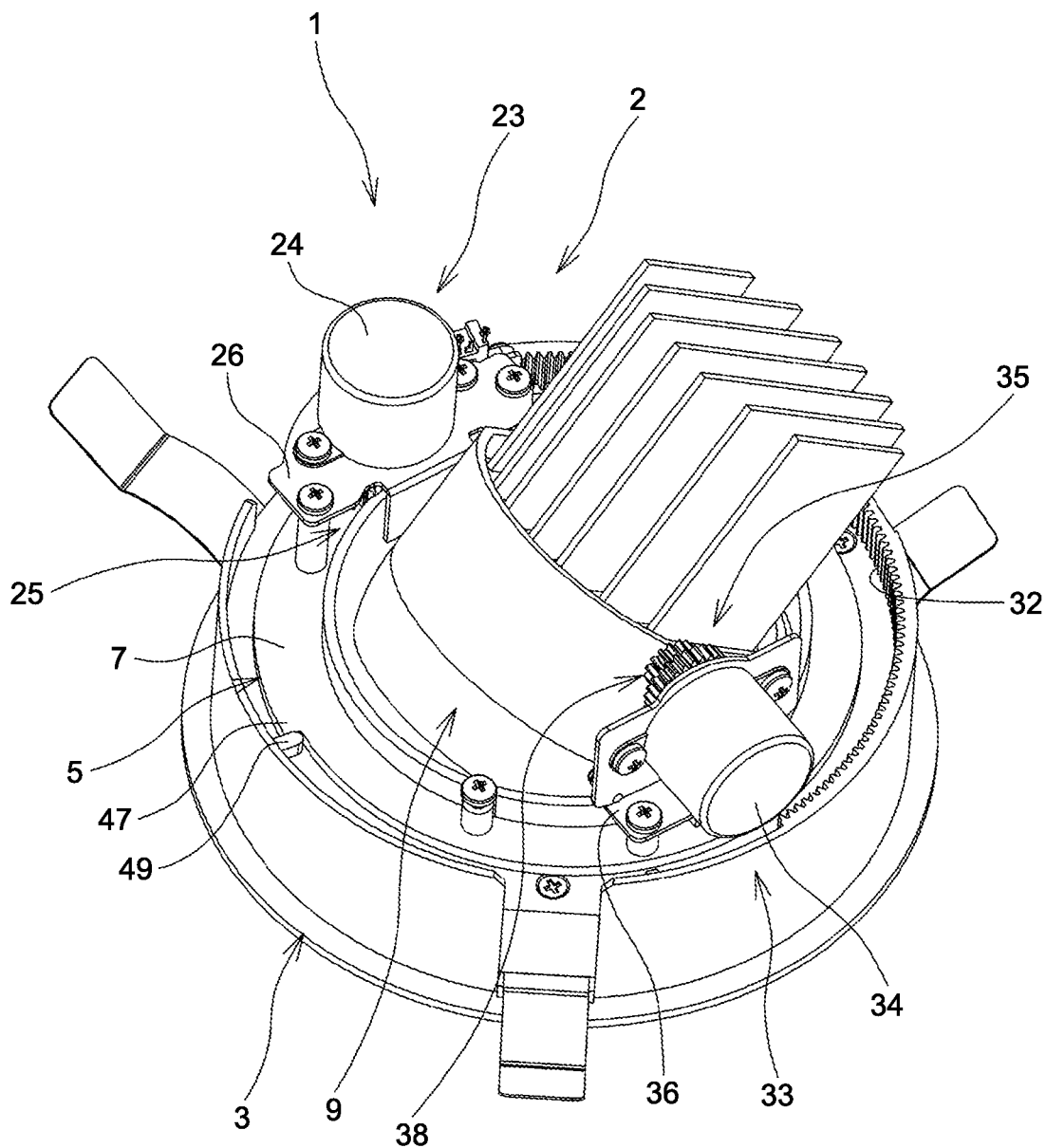
FIG. 14 is a perspective view illustrating the lighting apparatus, and is a view especially illustrating the state changed from an initial state of the angle adjuster to a state where the vertical rotation frame is rotated in the vertical direction.
Figure 15:
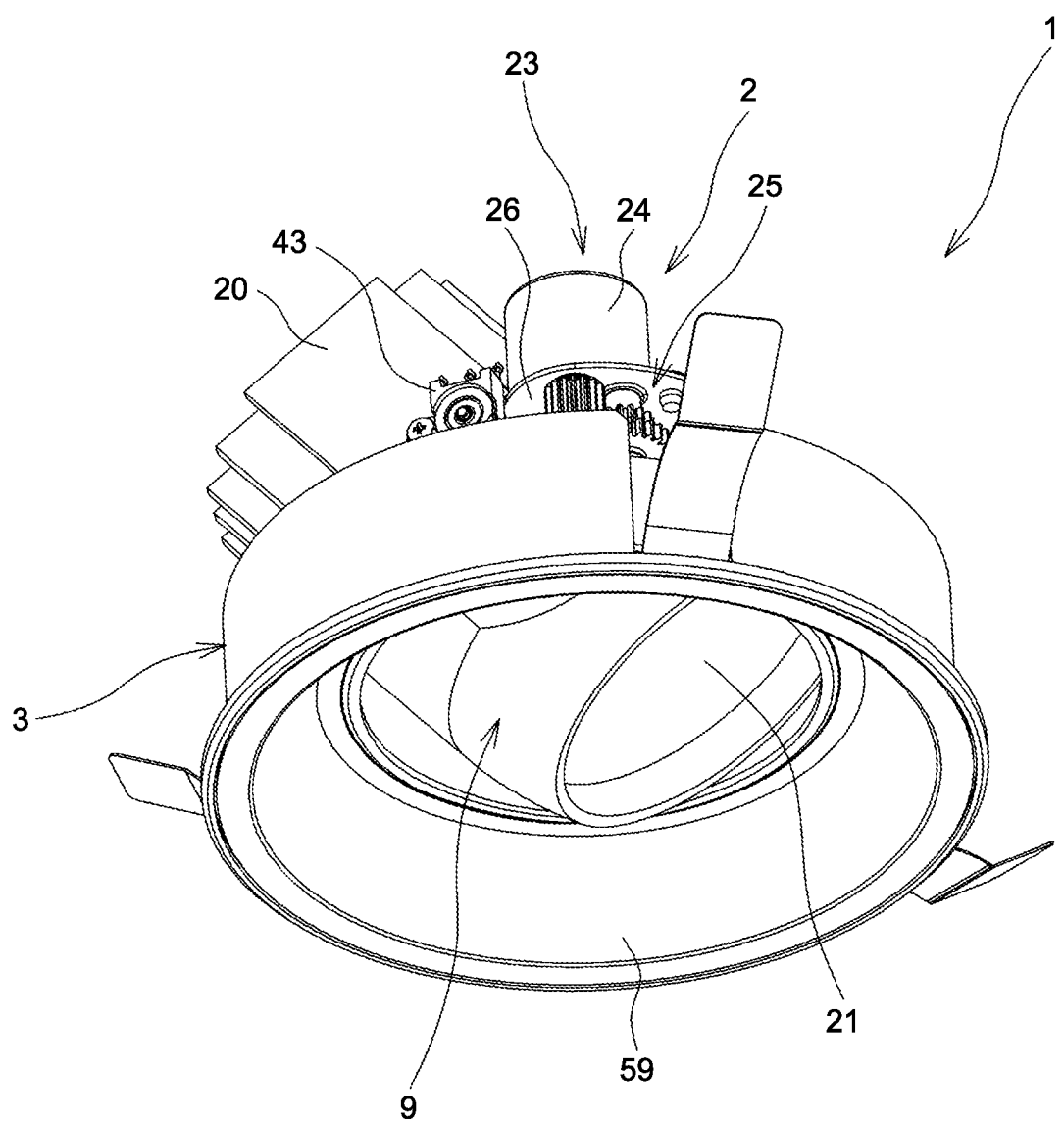
FIG. 15 is a perspective view illustrating the lighting apparatus, and is a view especially illustrating the lighting apparatus in the state illustrated in FIG. 14 viewed from another sight different from the sight in FIG. 14.

In this manner, the vertical rotation frame 9 rotates in the vertical direction so as to incline the irradiation direction to a specified angle as illustrated in FIG. 14. FIG. 15 is a perspective view illustrating the lighting apparatus 1 in a state corresponding to the state in FIG. 14, and is a perspective view illustrating the lighting apparatus 1 viewed from another sight different from the sight in FIG. 14.

For example, when the lighting apparatus 1 is in a state illustrated in FIG. 15 and the irradiation direction is rotated in the horizontal direction, in other words, when the irradiation direction (irradiation shaft) is moved (rotated) along the side of a circular cone whose center line corresponds to the shaft line (center line of the embedded hole) of the lighting apparatus 1, operation of a remote controller operated by an operator causes the rotation shaft 24A of the first motor 24 to rotate in a direction specified by a rotation angle (angular displacement) corresponding to the number of pulse input. The rotation of the rotation shaft 24A of the first motor 24 is transmitted to the first gear mechanism 25 through the first pinion 31, and is accelerated and transmitted to the horizontal rotation frame 5 through the small gear 29 (first gear) of the first stepped spur gear 28 engaged with the first pinion 31, the large gear 30 (second gear) of the first stepped spur gear 28, and the internal teeth 32 engaged with the large gear 30.

In this manner, the horizontal rotation frame 5 rotates in the horizontal direction so as to rotate the irradiation direction (irradiation shaft) in the horizontal direction while an inclination angle with respect to a perpendicular line is kept. The explanation is given individually on the rotation operation of the horizontal rotation frame 5 in the horizontal direction by the first driver 23 and the rotation operation of the vertical rotation frame 9 in the vertical direction by the second driver 33, but the controller can control the first driver 23 and the second driver 33 at the same time through the operation of a remote controller operated by an operator. In other words, the angle adjuster 2 can perform the rotation operation of the horizontal rotation frame 5 in the horizontal direction and the rotation operation of the vertical rotation frame 9 in the vertical direction at the same time.

This embodiment exerts the following effects. According to the embodiment, the angle adjuster 2 is configured by disposing the first driver 23 for driving the horizontal rotation frame 5 (horizontal direction rotator) to rotate in the horizontal direction and the second driver 33 for driving the vertical rotation frame 9 (vertical direction rotator) to rotate in the vertical direction on the horizontal rotation frame 5. Applying this angle adjuster 2 can reduce the size of the lighting apparatus 1, especially shorten the total length thereof, and, for example, can provide the lighting apparatus 1 suitable for a ceiling-embedded universal downlight that is restricted in depth. Forming the internal teeth 32 that configures the first gear mechanism 25 on the inner periphery of the fixed frame 3 can make not only the size of the angle adjuster 2 in the horizontal direction but also the outer diameter of the fixed frame 3 smaller as compared with the case of forming the external teeth on the outer periphery of the fixed frame 3, and can provide the lighting apparatus 1 capable of corresponding to a smaller embedded hole.

In the embodiment, the angle adjuster 2 is configured by using stepped spur gears having the same shape as the first stepped spur gear 28 embedded in the first gear mechanism 25 and the second stepped spur gear 38 embedded in the second gear mechanism 35 to engage the small gear 29 (first gear) of the first stepped spur gear 28 with the first pinion 31 fixed to the rotation shaft 24A of the first motor 24 and the large gear 40 (second gear) of the second stepped spur gear 38. In this manner, the stepped spur gears 28 and 38 having the same shape are selectively used as the acceleration side and the deceleration side. Accordingly, stepping motors having the same shape (same type) can be used as the first motor 24 and the second motor 34, and the first driver 23 and the second driver 33, and furthermore the angle adjuster 2 can be simply configured. In addition, standardizing components that form an apparatus can improve productivity and reduce manufacturing costs at the same time. Most of the first driver 23 and the second driver 33 are formed by common components. Accordingly, weight balance of a whole apparatus is easily equalized and an angle can be smoothly adjusted by disposing the first driver 23 and the second driver 33 symmetrically with respect to the center line (in the embodiment, a straight line corresponding to the rotation shaft of the horizontal rotation frame 5) of the lighting apparatus 1 or a light axis of the lighting apparatus 1. Similarly, disposing the first driver 23 and the second driver 33 symmetrically with respect to a straight line corresponding to the rotation shaft of the horizontal rotation frame 5 provides a disposed position capable of minimizing the size of each component in order to rotate the vertical rotation frame 9 in the vertical direction without interfering with the first driver 23 and the second driver 33. The shape of the stepped spur gears 28 and 38 is selected so that a rotation angle (angular displacement) of the horizontal rotation frame 5 in the horizontal direction upon input of one pulse to the first motor 24 is identical or substantially equal to a rotation angle (angular displacement) of the vertical rotation frame 9 in the vertical direction upon input of one pulse to the second motor 34. Accordingly, the control of the controller can be simplified, and manufacturing costs can be reduced while reliability can be improved. Furthermore, the angle adjuster 2 has both a function of electrically detecting a rotation angle of the horizontal rotation frame 5 and the vertical rotation frame 9 and a function of mechanically restricting rotation of the horizontal rotation frame 5 and the vertical rotation frame 9. These functions can surely prevent damage of an apparatus and eventually improve reliability of the apparatus.

Embodiments are not limited to the embodiment described above, and for example, can be configured as follows. The controller can be configured by installing a plurality of lighting apparatuses 1 on a ceiling and connecting each of the lighting apparatuses 1 through wireless communication so as to remotely control the lighting apparatuses 1 at the same time through one remote controller. In the controller, remote control through wireless communication is not limiting, and, for example, an operating unit operated by an operator and the angle adjuster 2 may be connected by wire. A light source (operation target) is not limited to the LEDs 18, and, for example, a krypton bulb is applicable. The embodiment exemplifies the ceiling-embedded lighting apparatus 1, but the lighting apparatus 1 that is connected to an arm and the like and is hung from a ceiling surface or a wall surface and the lighting apparatus 1 that is supported by a base connected to an arm are applicable. The motors 24 and 34 are not limited to stepping motors, and direct-current (DC) motors, direct-current (DC) brushless motors, alternating-current (AC) motors and the like are applicable. Also in this case, current control by the controller can be simplified by making a rotation angle (angular displacement) of the horizontal rotation frame 5 in the horizontal direction identical or substantially equal to a rotation angle (angular displacement) of the vertical rotation frame 9 in the vertical direction. In the embodiment, the motors 24 and 34 are used as drive sources of the first driver 23 and the second driver 33, but the angle adjuster 2 can be configured so that an angle of a light source (operation target) is adjusted by manual operation, for example, operation of a lever and the like.

The present invention can reduce the size of an angle adjuster and a lighting apparatus with the angle adjuster.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An angle adjuster for adjusting an angle of an operation target, the angle adjuster comprising:
    a frame body;
    a horizontal direction rotator that is rotatably supported in a horizontal direction by the frame body;
    a vertical direction rotator that is rotatably supported in a vertical direction by the horizontal direction rotator, wherein the operation target is fixed to the vertical direction rotator;
    a first driver that drives the horizontal direction rotator, the first driver including a first motor as a drive source and a first gear mechanism that transmits drive power of the first motor to the horizontal direction rotator; and
    a second driver that drives the vertical direction rotator, the second driver including a second motor as a drive source and a second gear mechanism that transmits drive power of the second motor to the vertical direction rotator, wherein:
    the first driver and the second driver are mounted to the horizontal direction rotator through a structural element and disposed symmetrically with respect to a center line of the operation target; and
    components of the first driver and components of the second driver are same type of components.

2. The angle adjuster according to claim 1, wherein:
    the first gear mechanism comprises a first stepped spur gear in which a plurality of gears having different outer diameters are formed;
    the second gear mechanism comprises a second stepped spur gear in which a plurality of gears having different outer diameters are formed; and the first stepped spur gear and the second stepped spur gear have an identical shape.

3. The angle adjuster according to claim 2, wherein:
the first stepped spur gear has a first gear engaged with a first pinion fixed to a rotation shaft of the first motor; and
the second stepped spur gear has a second gear engaged with a second pinion fixed to a rotation shaft of the second motor.

4. The angle adjuster according to claim 3, wherein
the first gear mechanism includes internal teeth formed on an inner periphery of the frame body; and
the internal teeth are engaged with a third gear of the first stepped spur gear.

5. The angle adjuster according to claim 1, wherein
the angle is adjusted through remote control.

6. A lighting apparatus comprising:
the angle adjuster according to claim 1, wherein
the operation target is a light source.

* * * * *